Figures 1, 5:
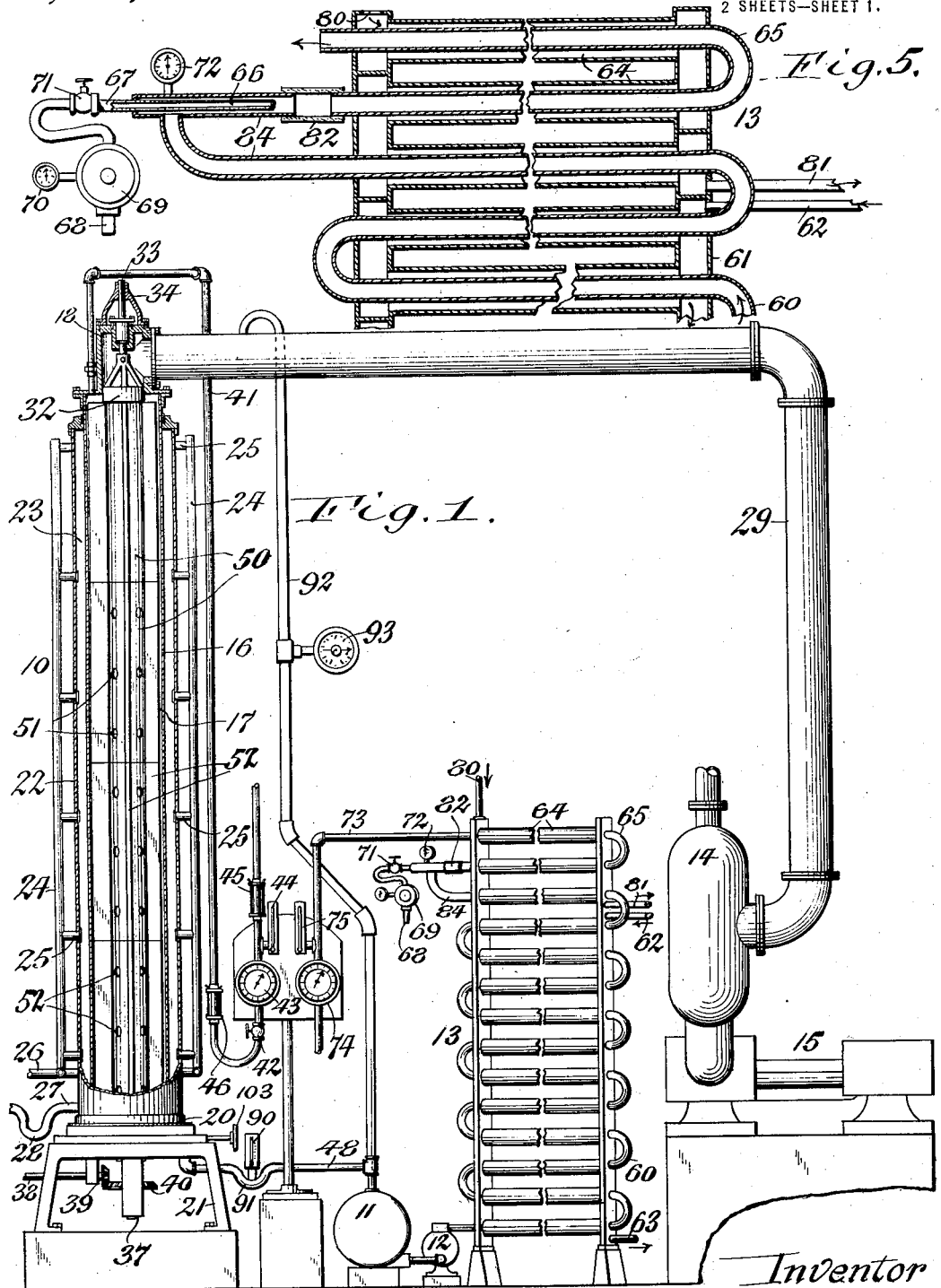

E. ZAHM.
PROCESS AND APPARATUS FOR CONCENTRATING LIQUIDS.
APPLICATION FILED SEPT. 12, 1919.

1,405,085.  Patented Jan. 31, 1922.
2 SHEETS—SHEET 1.

Inventor
Edward Zahm
by Geyer & Popk
Attorneys

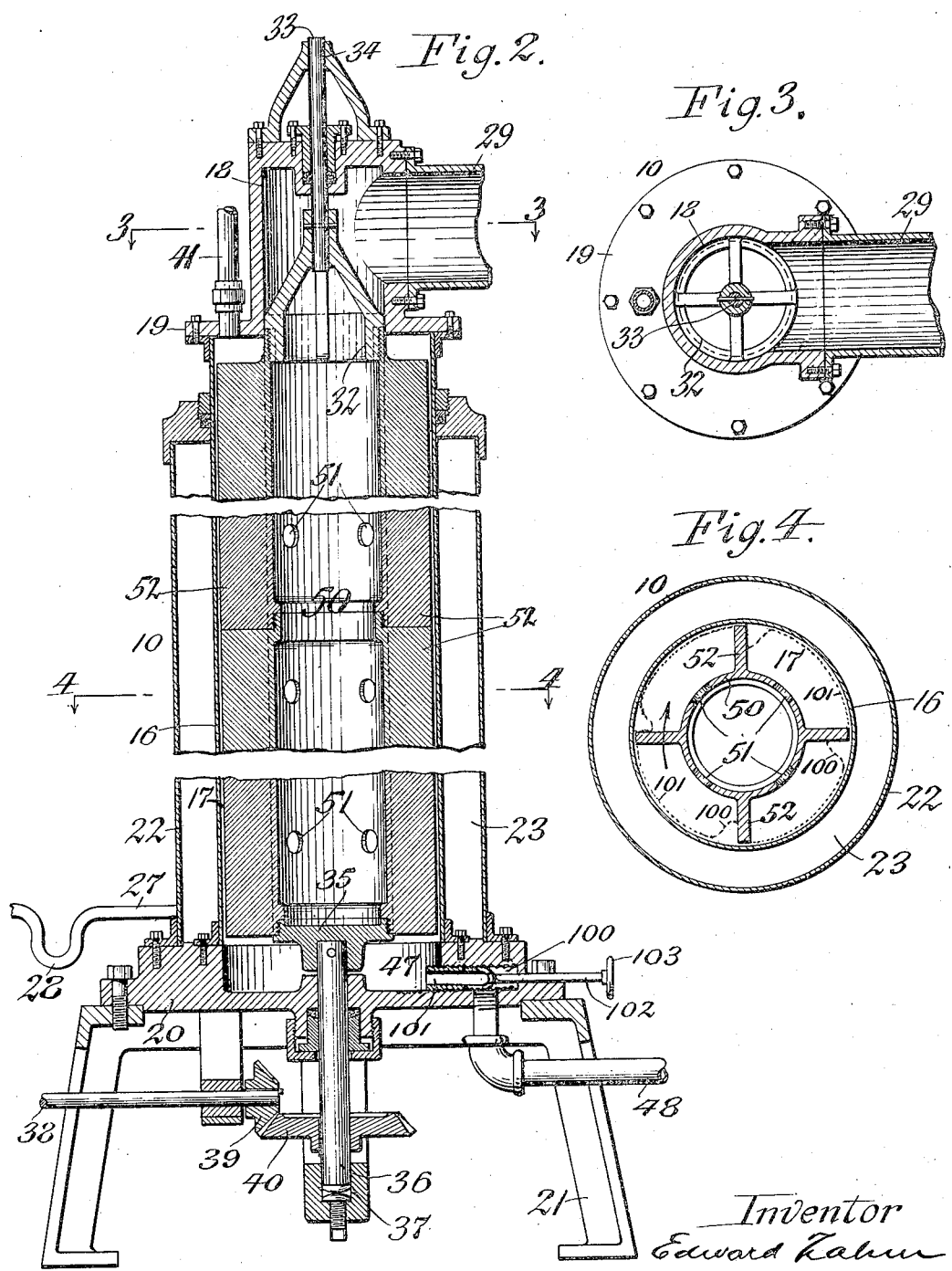

UNITED STATES PATENT OFFICE.

EDWARD ZAHM, OF BUFFALO, NEW YORK, ASSIGNOR TO ZAHM & NAGEL CO., INC., OF BUFFALO, NEW YORK, A CORPORATION OF NEW YORK.

PROCESS AND APPARATUS FOR CONCENTRATING LIQUIDS.

1,405,085.      Specification of Letters Patent.    Patented Jan. 31, 1922.

Application filed September 12, 1919. Serial No. 323,355.

*To all whom it may concern:*

Be it known that I, EDWARD ZAHM, a citizen of the United States, residing in Buffalo, in the county of Erie and State of New York, have invented new and useful Improvements in Processes and Apparatus for Concentrating Liquids, of which the following is a specification.

This invention relates to a process and apparatus for concentrating liquids and more particularly liquids, the constituents of which are of an organic nature and the qualities of which would be impaired if the liquid were subjected to a high temperature for a considerable period of time. Although this process and apparatus are designed more particularly for dealcoholizing beer the same are equally useful for treating or concentrating other liquids which have a tendency to foam when they are concentrated by boiling either at atmospheric pressure or in vacuo.

The object of this invention is to provide a process and apparatus for treating beer and other foaming liquids whereby the alcoholic content in the same may be reduced or the liquid is concentrated quickly and economically and without impairing the taste or quality of the remaining constituents by excessive heat.

In the accompanying drawings:

Figure 1 is a side elevation, partly in section, of one form of apparatus for practicing my invention. Figure 2 is a fragmentary vertical section of the liquid heating and separating apparatus on an enlarged scale, forming part of my invention. Figures 3 and 4 are horizontal sections taken on the correspondingly numbered lines in Fig. 2. Figure 5 is a fragmentary longitudinal section, on an enlarged scale, of the cooler and the carbonator connected therewith.

Similar characters of reference refer to like parts throughout the several views.

In its general organization the preferred form of apparatus shown in the drawings for carrying my invention into effect comprises a separator 10 which receives the beer or other liquid to be concentrated, a receiver 11 into which the concentrated liquid is discharged from the separator, a pump 12 which receives the liquid from the receiver, a cooler 13 which receives the beer from the pump preparatory to storing or packing the same into bottles or barrels, a vacuum condenser 14 which receives the vapors from said separator, and a vacuum pump 15 connected with the condenser.

The construction of the separator may be varied as to its details but as shown in the drawings the same is preferably constructed as follows:

16 represents the cylindrical upright wall of the separating chamber 17 which wall is preferably constructed of copper or other suitable material having a high heat conducting capacity. Above the upper end of this separating chamber is arranged a head having a central upwardly projecting hollow dome 18 preferably of cylindrical form and an annular flange 19 arranged at the lower end of the dome and connected at its outer edge with the upper end of the separator wall. The lower end of the separating chamber is closed by a lower head 20 which is secured to the lower end of the wall 17 and is supported on a base or pedestal 21 of any suitable construction.

Surrounding the wall of the separating chamber is a shell 22 which is separated from this wall by an intervening space or jacket 23 which is adapted to receive steam or other heating medium for indirectly heating the liquid on the inner surface of the wall 16. The steam or other heating agent is preferably supplied to this heating jacket by means of a plurality of upright manifolds 24 which are connected with a steam supply pipe 26 and each manifold being provided with a plurality of branch pipes or nipples 25 which open into the heating jacket at different points in its height. The water of condensation is withdrawn from the lower end of the heating jacket by a discharge pipe 27 having a trap 28 to prevent the egress of any steam at this point.

The vapors which are separated from the beer or other liquid under treatment are withdrawn from the dome 18 through a vapor discharge pipe 29 which latter has its outlet connected with an exhausting device of any suitable character for producing a vacuum in the separating chamber. As shown in Fig. 2 this exhausting device preferably comprises a condenser 14 which as shown is of the jet type but may be of any other suitable form and which receives the vapors from the outlet of the pipe 29 and the wet vacuum pump 15 which is connected with the outlet of the condenser and whereby the condensed vapors together with the condensing water are discharged. In the event that it is desired to utilize the condensed vapors which are separated from the liquid the recovery of the same may be affected by substituting a dry vacuum pump and a surface condenser for the wet vacuum pump and jet condenser.

Arranged within the separating chamber is a hollow cylindrical drum 50 which rotates about a vertical axis coincident with that of the separating chamber and extending at its upper end into the dome 18 and forming a rotary joint therewith so that this dome communicates directly with the interior of the drum but does not communicate directly with the annular separating space 17 between the periphery of the drum and the bore of the wall 16. The upper end of the drum is provided with an open work or skeleton head 32 which is connected to the lower end of an upright shaft 33 journaled in a bearing 34 at the upper end of the dome 18.

The lower end of the drum is closed by a head 35 and the latter is secured to the upper end of an upright shaft 36 which is journaled at its lower end in a step bearing 37 on the base or pedestal of the separator. Rotary motion may be imparted to the drum and connecting parts in any suitable manner, for instance, as shown in the drawings, by means of a driving shaft 38 journaled horizontally in suitable bearings on the base and provided with a driving bevel gear pinion 39 which meshes with a driven bevel gear wheel 40 on the shaft 36.

The raw liquid which is to be concentrated or dealcholized may be introduced into the separating space in any suitable manner, for instance, as shown in Figs. 1 and 2, by a supply pipe 41 having its delivery end secured to the flange 19 and opening into the upper end of the separating space. This supply pipe may draw its supply of liquid from any source and the same is provided with a meter 43 for determining the amount of liquid supplied to the apparatus, and with a valve 42 on the outlet side of the meter for controlling the supply of liquid to the separator, also with the thermometer 44 arranged on the inlet side of the meter for determining the temperature of the liquid and sight glasses 45, 46 arranged in said pipe in front of the thermometer 44 and in rear of the valve 42 in order to enable the attendant to note the flow of liquid to the apparatus.

The drum 50 is preferably constructed of a plurality of cast metal sections which are arranged end to end and connected with each other by screw joints. Each of these sections, except the uppermost, is provided with a plurality of radial openings 51 which place the interior of the drum in communication with the separating chamber or annular space between the periphery of the drum and the bore of the wall 16, thereby causing the upper end of the separating chamber to form a pocket which is not directly connected with the interior of the drum and is not in the path or stream of the vapor. On the exterior of the drum the same is provided with a plurality of wings, blades or impellers 52, preferably four in number, which extend the full length or nearly so of drum and separator wall 16, and travel at their outer edges about one-sixteenth of an inch from the inner surface or bore of the separator wall.

The lower head 20 of the separating chamber is provided with a cavity 47 which forms a downward extension of the separating chamber. This cavity is connected at its sides by a pipe 48 with the inlet of the receiver 11. From the latter the concentrated liquid is delivered to the cooler by the pump 12, the operation of the latter being controlled by a float in the receiver in a well known manner. The pipe 48 is provided with a thermometer 90 arranged in a U-trap 91 of said pipe for determining the temperature of the liquid as it is discharged from the separator. An equalizing pipe or conduit 92 connects the top of the receiver 11 with the vapor discharge pipe 29 which equalizes the pressures in the chamber and pipe so that the concentrated liquid will flow freely from the separator into the receiver. The vacuum gage 93 in the pipe 92 permits of noting the vacuum carried in the apparatus.

The outlet 100 at the lower end of the separating chamber which communicates with the discharge pipe 48 is provided with means whereby the depth of the banks of liquid which accumulate on the inner side of the separator wall can be regulated to insure an intermittent banking and layer depositing action of the liquid by the blades against the separator wall throughout the full length thereof and also to suit the character of the liquid which is being treated. The means for this purpose shown in Fig. 2 comprises a radially movable regulating nipple 101 which has an external screw thread engaging with an internal thread in the outlet of the separator. The line at which the liquid escapes from the separating chamber is determined by the position of the inner end of the regulating nipple so that by adjusting this nipple either toward or from the center of the separating chamber, the thickness of the banks of liquid in front of the blades can be so determined as will produce the best results according to the character of the liquid which is being treated and also rendering it possible to maintain the banks of liquid on the wall of the separator up to the outlet thereof so that the liquid will be alternately picked up in the form of a bank and then released in the form of a layer, as previously described. The turning of the regulating nipple for moving the same in or out relatively to the wall of the separating chamber may be effected by a shifting rod 102 extending through the base 20 and provided externally of the latter with a handle 103, as shown in Fig. 2.

The liquid cooler is preferably so constructed that the liquid is first cooled by water at a moderately low temperature and then the same is cooled to nearly freezing point or cellar temperature in order to enable the same to take up carbonic acid gas. For this purpose the cooler is provided with lower coils 60 which are enclosed by a water jacket 61 having an inlet 62 at its upper end for cold water and an outlet 63 at its lower end for the spent water, while the upper coils 65 of the cooler are enclosed by a jacket 64 having an upper inlet 80 for cold brine or other suitable refrigerant and a lower outlet 81 for the spent brine. A portion of that section of the coil which is cooled by brine is provided with an extension loop 84 one branch of which contains an observation glass 82 and means for carbonating the liquid before the same is stored or packed.

This carbonating device may be variously constructed but as shown in Fig. 5 the same comprises a porous tube 66 secured within the loop 84 and having its inlet 67 arranged outside of this loop and connected with a supply pipe 68 for connecting the same with a carbonic acid gas supply. The pipe 68 is provided with a pressure regulator 69, a pressure gage 70 and a hand valve 71 for controlling the supply of gas to the liquid. The loop 84 is also preferably provided with a pressure gage 72 for determining the pressure in the liquid conduit.

After the liquid has passed the cooler and carbonator the same is carried by a delivery pipe 73 to the cellar or other place where the same is stored or packed. This pipe contains a meter 74 for determining the quantity of concentrated liquid discharged from the apparatus, and the same also contains a thermometer 75 for observing the temperature at which the liquid leaves the cooler.

When operating this apparatus for concentrating or dealcoholizing fermented liquids, such as beer, a stream of liquid is admitted into the top of the separating chamber while the latter is externally heated. As the liquid enters this chamber a centrifugal motion is imparted to the same by the rotary blades 52 and causes the same to assume the form of tubular stream against the inner side of the wall 16 and gradually flow from the inlet pipe 64 at the top of the separating chamber to the outlet pipe 48 at the bottom thereof.

During its flow from the inlet to the outlet of the separating chamber the centrifugal action of the impeller blades therein causes the stream of liquid to form thin layers of liquid 101 and banked masses 100 of liquid which alternate with each other circumferentially about the axis of the separator wall, as shown diagrammatically in Fig. 4. The banks of liquid 100 travel before the several blades and are under the pressure of the latter which prevents the formation of foam. The spaces between the outer edges of the heated separator wall permit portions of the liquid to escape from the influence of the blades and form the thin layers 101 extending from the rear side of each blade to the bank of liquid in front of the next following blade. The liquid forming these thin layers is released from the pressure of these blades and subjected to the rapid evaporating effect of the heated separator wall. The unevaporated portion of each liquid layer which was momentarily released from the pressure of one blade is taken up and merged into the bank of liquid traveling before the succeeding blade and thus again placed under pressure. All parts of the liquid are thus rapidly and intermittently subjected to pressure and released from pressure so that concentration of the liquid is effected in a short time and a comparatively large volumn of liquid can be treated from the time it enters the separating chamber to the time it leaves the same.

Assuming the impelling blades to have a peripheral diameter of fifteen inches, and rotating at four hundred R. P. M., the pressure produced by the centrifugal force would be more than sufficient to neutralize the effect of the twenty five inch vacuum produced by the condenser and vacuum pump, thereby maintaining the liquid at a temperature in excess of that which it would have under atmospheric pressure and thus raising its boiling point above 212 degrees F. Consequently if the heat applied externally to the separator wall is below the boiling point of the liquid, the latter cannot be brought to its boiling point under pressure to which the centrifugal force subjects it.

With four impeller blades rotating at 400 R. P. M. the time elapsing between pressing the liquid and releasing the same from pressure would be about one-twenty-fifth of a second. This intermittent action permits the transmission to the liquid of heat sufficient to rapidly volatilize the alcoholic content without exerting a detrimental influence on the liquid which is being treated.

Owing to the fact that the liquid held under pressure at the tips of the impeller blades does not reach the boiling point it follows that the liquid does not foam. Furthermore the interval of time, during which the liquid escapes from each blade and is permitted to boil, is so short that the tendency to foam has no opportunity to develop before the foam is dissipated.

The stream of liquid entering at the top of the separating chamber has a tendency to foam, due principally to its containing carbonic acid gas which though held absorbed under atmospheric pressure, is released when the liquid is subjected to a partial vacuum. This foam is however, prevented from passing into the vapor stream and escaping from the drum to the condenser and vacuum pump before the liquid is brought under the pressure of the centrifugal force by making the upper part of the rotary drum imperforate, thereby forming a practically closed pocket at the upper end of the separating chamber which is free from traveling vapor and thus causing the liquid to be placed under centrifugal motion and pressure before any particles of liquid can be drawn into the hollow drum and carried to the condenser with the vapors.

Obviously the liquid to be treated should be as free as possible from carbonic acid gas as the latter does not condense and consequently taxes the vacuum pump in proportion as the gas is present.

By maintaining a vacuum of about twenty three inches and a temperature of about 200 degrees F. on the outer surface of the rotary drum and rotating the blades at 400 R. P. M. the drum being fifteen inches in diameter and twelve feet long, the alcohol in a beverage containing 2.60% may be reduced to 0.2% at the rate of twenty barrels per hour with an evaporation of about twenty-five percent.

The liquid during the process of concentrating or dealcoholizing the same is exposed to heat for only a few seconds and then flows from the heated separating chamber to the receiver. From the latter the liquid is withdrawn and forced through the cooler by the cooler pump whereby the liquid is reduced to the temperature suitable for carbonating the same before leaving the apparatus thereby preventing the liquid from absorbing atmospheric air which, with its infections is well known, impairs the quality of the product.

The carbonic acid gas is supplied by the porous tube 66 to the liquid as the latter passes through the loop 68.

Inasmuch as the inflow of liquid may be measured by the incoming meter and the outflow of the finished product may be measured by the outgoing meter, the difference in flow indicated by the inflowing and outflowing meters shows the amount of evaporation which has taken place in the liquid during the concentrating or dealcoholizing process.

I claim as my invention:

1. The hereindescribed method of evaporating liquids which consists in mechanically subjecting the liquid to a centrifugal motion on the interior surface of an externally heated cylinder, and removing the vapors at the axis of the applied force and at a plurality of different points in the length of the cylinder.

2. An apparatus for evaporating liquids comprising a cylinder which is adapted to be heated externally and provided at one end with an inlet for the raw liquid and an outlet for the vapor, and at its other end with an outlet for the concentrated liquid, a rotary tube arranged lengthwise in the cylinder and provided at different points in its length with perforations and communicating at one end with said vapor outlet, and wings arranged on the exterior of said tube and traveling close to the bore of said cylinder.

3. An apparatus for concentrating liquids comprising an upright cylindrical separating chamber having an inlet at its upper end for the raw liquid and an outlet at its lower end for the concentrated liquid, a dome communicating with the central part of the separating chamber at the upper end thereof and having a vapor outlet which is adapted to be connected with an exhausting device, and a hollow upright drum rotatably mounted within the separating chamber and having its upper end opening into said dome and provided with peripheral blades extending close to the inner surface of said separating chamber and said drum being also provided with radial perforations at different points in the length of the same.

4. An apparatus for concentrating liquids comprising an upright cylindrical separating chamber having an inlet at its upper end for the raw liquid and an outlet at its lower end for the concentrated liquid, a dome communicating with the central part of the separating chamber at the upper end thereof and having a vapor outlet which is adapted to be connected with an exhausting device, and a hollow upright drum rotatably mounted within the separating chamber and having its upper end opening into said dome and provided with peripheral blades extending close to the inner surface of said separating chamber and said drum having its upper part imperforate while its lower part is provided with radial perforations.

EDWARD ZAHM.